C. L. TURNER.

STILL.

APPLICATION FILED JULY 8, 1915.

Reissued Jan. 18, 1916.

14,050.

2 SHEETS—SHEET 1.

Inventor
Cecil L. Turner
By his Attorney
Charles G. Hensley.

C. L. TURNER.
STILL.
APPLICATION FILED JULY 8, 1915.
Reissued Jan. 18, 1916.
14,050.
2 SHEETS—SHEET 2.
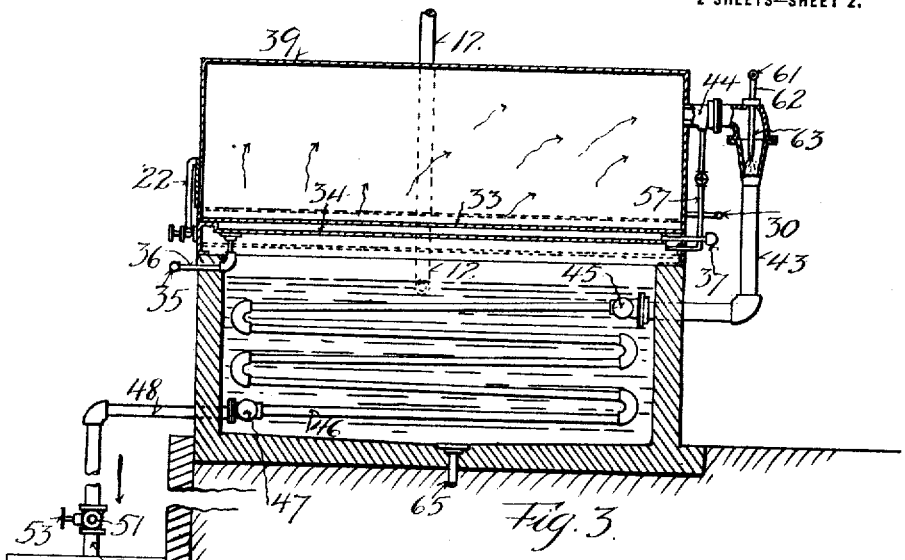
Fig. 3.
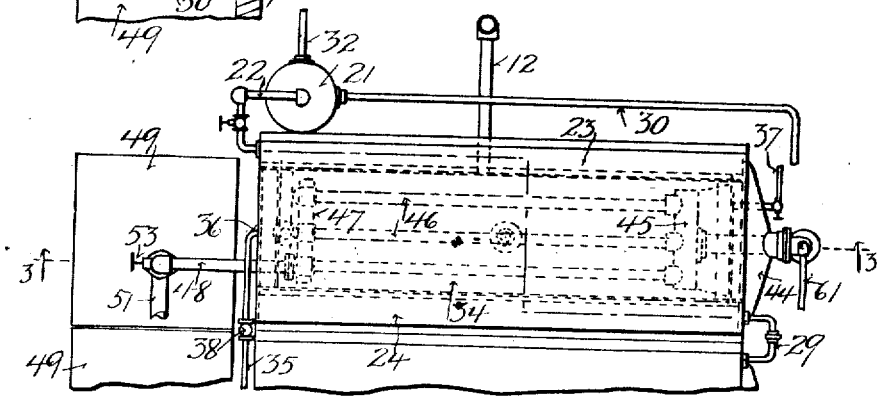
Fig. 4.
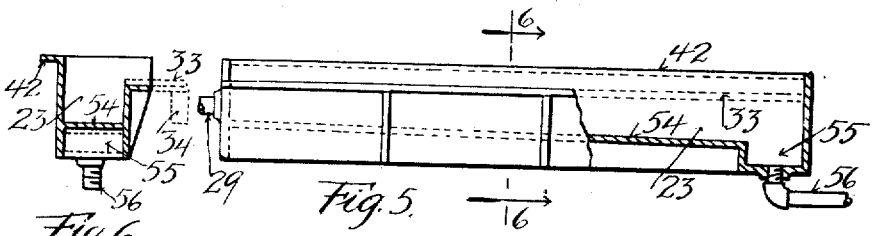
Fig. 5.
Fig. 6.
Cecil L. Turner Inventor
By his Attorney Charles G. Hensley

UNITED STATES PATENT OFFICE.

CECIL L. TURNER, OF NEW YORK, N. Y., ASSIGNOR, BY DIRECT AND MESNE ASSIGNMENTS, TO IMPROVED STILL COMPANY, A CORPORATION OF DELAWARE.

STILL.

14,050. Specification of Reissued Letters Patent. Reissued Jan. 18, 1916.

Original No. 1,091,781, dated March 31, 1914, Serial No. 689,700. Application for reissue filed July 8, 1915. Serial No. 38,757.

*To all whom it may concern:*

Be it known that I, CECIL L. TURNER, a subject of the King of Great Britain, and a resident of Richmond borough, city of New York, in the county of Richmond and State of New York, have invented a new and Improved Still, of which the following is a specification.

Among the particular objects which the present invention has in view are: to provide a still wherein fractional and continuous distillation may be performed, and wherein such distillation of the hydrocarbon oils or other volatile liquids may be performed; to provide means for conserving the heat employed in the distillation, and to provide means for increasing the output of the stills adapted for practical fractional distillation.

Reference is to be had to the accompanying drawings forming part of this specification, in which similar characters of reference indicate corresponding parts in all the views, and in which—

Figure 1:
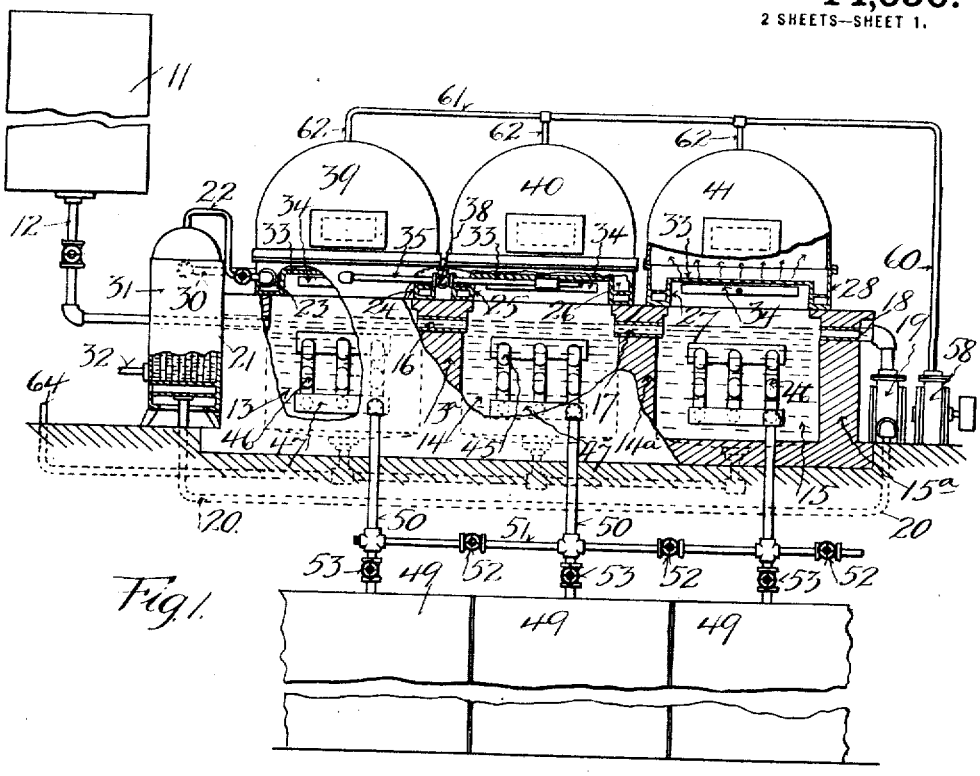
Figure 2:
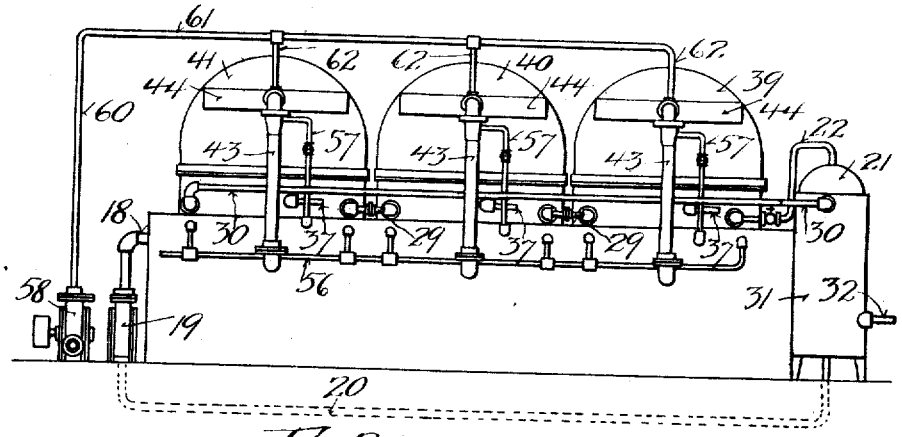

Figure 1 is a front view of a still constructed and arranged in accordance with the present invention, parts being broken away; Fig. 2 is a back view of the same; Fig. 3 is a vertical section taken on the line 3—3 in Fig. 4; Fig. 4 is a top view of the end section of the still; Fig. 5 is a detail view on an enlarged scale, partly broken, showing a support and drain gutter for the evaporating tables employed in the present invention; and Fig. 6 is a cross section taken on the line 6—6 in Fig. 5.

As shown in the accompanying drawings the still is adapted to be employed in the distillation or refining of hydrocarbon and crude oil although it is not limited to this particular purpose. In the operation of the invention, the oil is deposited in a tank 11 which is disposed at any suitable height. The oil is thence delivered to a basin 13 through the pipe 12, being the first of a series of similar basins. Thence the oil flows through a dividing wall 13ª by means of an overflow pipe 16, to a second basin 14, and thence through a dividing wall 14ª by means of an overflow pipe 17, to a third basin 15. It will be understood that the number of basins in the series may be varied or extended. In each of said basins the oil is adapted to be subjected to the action of a preheating system, later described. From the last basin of the series, in the present instance the basin 15, the oil is conducted through a wall 15ª by an overflow pipe 18 to a pump 19, to be thence delivered by way of a pipe 20 to a heat transfer tank 21. The oil rises in tank 21 through the lower chamber thereof through the pipes therein to the upper chamber thereof, and flows therefrom by way of a delivery pipe 22, by means of which the oil is deposited in a trough 23 which is the initial member of a series of troughs, pairs of which troughs are connected by a spreading or draining table. The second trough of the series referred to is designated by the numeral 24, which trough, as best seen in Figs. 1 and 4 of the drawings, is disposed in the evaporating chamber 39, at the side opposite the trough 23. The troughs 23 and 24 are disconnected, except as the oil is passed from one to the other by overflow across an evaporating table 33, as later set forth.

The trough 24 and the trough 25, the latter being the third of the series of troughs referred to, are connected by a pipe loop 29. The troughs 25 and 26, within evaporating chamber 40, and the troughs 27 and 28 within evaporating chamber 41, are disconnected, except as the oil flows from one to the other of a pair of troughs over an interposed evaporating table 33. The troughs 26 and 27 are connected by a pipe loop 29, the same as are the troughs 24 and 25. From the trough 28 the final of the series, the oil is conducted by a pipe 30, (Fig. 2) to the cylinder section 31 of the transfer tank 21, which section incloses the pipes of this tank so that the last named oil envelops the oil within the pipes of the transfer tank.

The cylinder section 31 is drained by a pipe 32 which leads the heavier, body or residual portion of the oil off to a reservoir or decanting station or other place of deposit.

As before stated, the tables 33 are disposed between each pair of troughs, such as between troughs 23, 24 and 25, 26 and 27, 28. The tables 33 are shown supported by the corresponding pairs of troughs 23, 24, 25, 26, and 27, 28. Said tables are shown each provided with a steam box or radiator 34, whereby the corresponding table 33 is heated. Each of the boxes or radiators 34 is supplied by a steam-heating system, said boxes being shown connected by means of nipples 36 (Fig. 4) to a steam supply pipe 35, and each box being provided with a steam-delivery pipe 37 Figs. 3 and 4. The pipe 37 may be returned to the boiler or steam generator to maintain circulation of heat and conservation thereof in the system by means of any suitable or well known traps, or the exhaust steam may be disposed of in any desired manner.

By means of suitable valves 38 (Fig. 4), disposed on or in connection with the steam-supply pipe 35, the degree of heat produced in each of the boxes or radiators 34 may be predetermined and maintained. It will be observed that the flow of the heated steam through the boxes 34 is transverse to the flow of oil from between the troughs 23 and 24 and between troughs 25 and 26 and the troughs 27 and 28; or, in other words, the flow of the heating medium is perpendicular to the progression of the oil under treatment. This insures that the oil is, during the passage through each evaporating chamber, subjected constantly to a predetermined degree of heat; therefore, the gravity of the distillate may be accurately predetermined and controlled as evolved in each evaporating chamber, by regulating the heat in each of the boxes or radiators 34 by manipulating the corresponding valve 38 to increase or diminish the flow of steam in the said boxes.

Each evaporating chamber is separated from the other by the domes 39, 40, and 41, which are shown as resting upon the flanges 42 of the troughs contained within said chambers. Each dome is suitably constructed to provide a sufficient area to promote the evaporation of the lighter vapors or gases from the body of the oil or liquid passing over the table 33 mounted within each chamber. The vapors, as evolved, rise to the upper portions of the domes, and are there drawn off through pipes 43 and bonnets 44 Fig. 3, each dome being provided with one of such pipes and bonnets. The bonnets 44 are preferably elongated horizontally, to remove the vapors evolved in the chambers at a certain level.

The various pipes 43 are each extended or communicate through the walls of the basins 13, 14 and 15, preferably through the basin corresponding to the dome above the same, and said pipes communicate with cooling coils in the basins, said pipes being shown operatively connected with a cross head drum 45, into which the vapors from the domes are delivered, and from which drums the vapors lead into cooling pipes or coils 46, wherein the vapors are cooled. The coils 46 are disposed substantially as shown in the drawings and are at the lower ends connected with a corresponding drum 47 in each basin. The drums 47 are provided with delivery pipes 48. Each pipe 48 is shown directly connected with separate collecting tanks 49, into which the condensed liquid or distillate is delivered by pipes 50.

It will be understood that there is a tank 49 shown assigned individually to each of the domes 39, 40, and 41 so that the distillates from the several domes, which under usual conditions are of different specific gravity, may be kept separate. The several distillates passing from the several domes to the several tanks 49 may each be maintained uniform or of the same specific gravity, by maintaining in the boxes or radiators 34 a constant heat and by maintaining a uniform flow of oil over the tables 33 in the domes. The several distillates passing from the several domes in the several tanks 49 may be of relatively different specific gravities according to increase in temperature of the oil as it passes from one dome to another. This rise in temperature may also be increased by controlling the passage of steam to the several boxes 34.

To accommodate the operation of the still, whereby the various products may be mixed, when desired, I connect the various pipes 50, by means of cross pipes 51, Figs. 1 and 4. Under normal conditions, the pipes 51 are closed by valves 52 connected therewith. Under normal conditions, pipes 50 are open to the tanks 49, but when desired, these pipes may be closed by valves 53 and the valves 52 opened, thereby diverting the flow of oil from any particular one of the tanks for delivery to another of the battery of tanks.

To assist the circulation of the vapors from the said evaporating chambers, a fan 58 Fig. 1 is employed. The fan is driven from any suitable power supply, being connected therewith by a pulley 59. From the fan 58, air is delivered by way of a pipe 60, to a horizontally extended pipe 61. The pipe 61 is connected by branch pipes 62 to nozzles 63, Fig. 3. Nozzles 63 are each introduced into the corresponding pipes 43 through which the heated vapors are led from various domes 39, 40 and 41. When the fan 58 is in operation, pressure in the pipes 60, 61 and 62 drives the vapor downward through the pipes 43, to produce therein an action resembling the action of a pulsometer or injector of usual construction and operation. The current established in this manner in the pipes 43 operates to rapidly and positively draw off the vapors from the various domes 39, 40, and 41, and to create therein a slight rarefaction which promotes the evolvement of the desired vapors from the oil or liquid in each dome.

Certain oils have water mixed therewith, which, under favorable conditions, will precipitate out of the oil. Such conditions are to be found in the troughs 23 to 28 inclusive, wherein the inclined bottoms 54 deliver the water precipitated from the oil to sumps 55, Fig. 5. From the sumps 55, the water is drawn by branch pipes 56 for delivery to any convenient waste or pound. Under the ordinary service conditions of the still, a water level is maintained in the system, which level rises to above the entrance of the branch pipes 56, within the sumps 55.

It will be understood from the foregoing description, stating the method employed for heating the oil preliminary to introducing the same into the evaporating chambers, that certain light but valuable volatiles will be given off by the oil in the basins 13, 14 and 15 which volatiles, rising under the corresponding boxes or radiators 34, will be expanded and when accumulated might form a pressure injurious to the perfect operation of the still. It is to provide an escapement for these volatiles from the basins 13, 14, and 15 that I provide draw-pipes 57 Fig. 3. Each pipe 57 is connected with the corresponding bonnet 44 or pipe 43, to be influenced by circulation in the said pipes 43 to form a slight but sufficient draft in said basins above the oil heated therein to carry off any volatiles. When the still is thus equipped, it will be seen that the light volatiles referred to are captured, and carried or conducted, with the vapors from the domes 39, 40 and 41, into the coils 46, for condensation therein.

A pipe is provided to draw off the oil or liquid from the basins 13, 14 and 15, when such action is deemed necessary or desirable. For this purpose, it will be noted that the floors of the various basins are dipped to the center, to deliver to drain pipe 65, which pipes are in open communication with the pipe 64, Fig. 1.

From the foregoing it will be understood that the crude oil delivered from the tank 11 is circulated through the basins 13, 14 and 15, being there subjected to the heat of the vapors in the respective coils 46, until, when the oil is delivered by the pipe 18 to the pump 19, it will have been raised in temperature considerably above the temperature of the body of oil contained in tank 11. As this partially heated oil is pumped through the pipes of the heat transfer tank 21, and thence flows through the troughs and over the tables in the evaporating chambers, it is raised in temperature by steam in the boxes or radiators 34, and when such heated oil passes through jacket 31, for delivery through the pipe 32, heat from such last named oil is transmitted to the oil flowing through the transfer tank from pump 19, whereby the temperature of said oil from the pump is further raised. When, now, after passing through the tank 21, the oil is delivered to the first of the domes 39, said oil has already been heated to a degree requiring but little further heat to evolve the vapors of the lighter oils. From this point on, the oil in flowing through the successive evaporating chambers is successively increased in heat evolving thereby from the body oil the various grades of lighter oils or distillates, which grades are predeterminedly arranged, as to the fractional distillation required.

It will also be observed that the heat of the domes and of the vapors liberated therein is conserved by passing the said vapors through the coils 46 to transfer heat from such vapors to the oil passing through the basins 13, 14, and 15. The conservation of heat thus outlined is in practice found to be such as to require a minimum supply of steam to the boxes 34. It will be obvious that if the vapors drawn from any and all of the evaporating chambers should not be fully condensed, when passing through the pipes 46, such vapors may be conducted thence through any well known coils to completely condense the vapors, the advantage of passing the vapors from the evaporating chambers first through the oil in the basins 13, 14 and 15, being to conserve the heat of such vapors and to apply the heat to the oil or liquid flowing into the still before such oil or liquid is subjected to the heat for distillation, the conservation of heat being further augmented by passing such preheated oil from the basins 13, 14 and 15, through the transfer tank to be further heated by the residual oil flowing from the evaporating chambers through pipe 30 to the cylinder section 31, of the heat transfer tank.

In the perfect running of the still, it will be understood that the initial heat for the still is supplied by the steam-heating system, of which the boxes or radiators 34 comprise a part.

Having thus described my invention, I claim as new and desire to secure by Letters Patent:

1. A still comprising a plurality of evaporating chambers, each having a spreading table disposed between troughs for receiving and delivering the oil in each chamber, said chambers being connected in series, means for delivering oil from the trough of the last of the series of chambers, a steam-heating system for said chambers embodying a radiator disposed adjacent the spreading table of each of said chambers and means for regulating the temperature of said radiators.

2. A still comprising a plurality of evaporating chambers, each chamber having a spreading table disposed between troughs for receiving and delivering the oil in each chamber, said chambers being connected in series, means for delivering oil from the trough of the last of the series of chambers, a steam-heating system for said chambers embodying a radiator adjacent the floor of each of said chambers, means for regulating the temperature of said radiators, means for conveying away from said chambers the vapors generated therein, and means for condensing said vapors by passing the same through the oil supplied to said chambers prior to introduction thereof to the first of said chambers.

3. In a still such as described, the combination with the oil supply source, basins in communication with said source, a series of evaporating chambers, means in each of said chambers for spreading the oil in a thin layer while passing therethrough, and an apparatus for maintaining circulation of said oil through said series of chambers, a steam-heating system embodying a plurality of radiators disposed under and adjacent to the spreading means of said chambers, a heater for the oil preliminary to the introduction thereof to the initial evaporating chamber, means for regulating independently the heat medium supplied to said radiators, means for applying steam to said radiators to cause the steam to travel in a direction transverse to the flow of the oil through said chambers, and a plurality of condensing coils, one of such coils being situated in each of said basins, said coils being in communication with corresponding evaporating chambers, said coils being adapted to transfer the heat of the vapors flowing from said chambers to the oil in the corresponding basins.

4. In a still such as described, the combination with an oil supply source, basins in communication with said source, a series of evaporating chambers, means in each of said chambers for spreading the oil in a thin layer while passing therethrough, and an apparatus for maintaining circulation of said oil through said series of chambers, a steam-heating system embodying a plurality of radiators disposed under and adjacent to the spreading means of said chambers, a heater for the oil preliminary to the introduction thereof to the initial evaporating chamber, means for regulating independently the heat medium supplied to said radiators, means for applying steam to said radiators to cause the steam to travel in a direction transverse to the flow of the oil through said chambers, a plurality of condensing coils, one of such coils being situated in each of said basins, said coils being in communication with corresponding evaporating chambers, said coils being adapted to transfer the heat of the vapors flowing from said chambers to the oil in the corresponding basin, and means in communication with said coils for accelerating the passage of the vapors from said chambers to said coils.

5. A still comprising an evaporating chamber, a spreading table therein, troughs on either side of said table for receiving and delivering the oil is said chamber, means for feeding oil to be treated to one of said troughs whereby the oil in passing from one trough to the other will be spread in a thin layer over said table, means for draining water from the troughs without disturbing the flow of oil over said table, heating means for said chamber embodying a radiator adjacent said spreading table, and means for regulating the temperature of said radiator.

6. A still comprising an evaporating chamber, a spreading table therein, troughs on either side of said table for receiving and delivering the oil in said chamber, means for feeding oil to be treated to one of said troughs whereby the oil in passing from one trough to the other will be spread in a thin layer over said table, heating means for said chamber embodying a radiator under the spreading table, means for feeding the heating fluid through the radiator so as to cause it to travel in a direction transverse to the flow of oil over said spreading table, whereby said table is maintained at a uniform temperature, and means for regulating the temperature of said radiator.

7. A plurality of independent evaporating chambers, each having a spreading table, troughs on either side of each of said tables for receiving and delivering the oil in each chamber, means for feeding oil to be treated to one of said troughs whereby the oil in passing from one trough to the other in said chambers will be spread in a thin layer over the corresponding spreading table, said troughs being connected in series whereby the oil will travel successively through the several exaporating chambers, over the corresponding spreading tables, heating means for said chambers embodying a radiator under respective spreading tables, and means for regulating the temperatures of said radiators independently, and means for taking and condensing the vapors from the several chambers.

8. A still comprising an evaporating chamber having a spreading table, troughs on either side of said table arranged whereby the oil in flowing from one trough to the other will be spread in a thin layer over said table, means for heating said table, means for condensing the vapor from said chamber by bringing it into juxtaposition to the oil before it is fed to said troughs, whereby said oil is heated, and means adapted to bring the residual oil from said chamber into juxtaposition to the oil after the latter has been heated by said vapor and before it is fed to said troughs, to preheat the oil.

9. A still comprising a plurality of evaporating chambers each having an evaporating table, troughs on either side of the table, arranged whereby the oil in passing from one trough to the other will be spread in a layer over the table, the several chambers being connected in series, means for feeding oil to the troughs in the first chamber for successive passage through said chambers, heating means for each chamber for heating the oil therein, means for separately condensing the vapors from said chambers by bringing them into juxtaposition to the oil which is fed to said first chamber and whereby said separate vapors will act on said oil successively and in the order in which the chambers in which they are derived are arranged in the said series, and means adapted to bring the residual oil from the last chamber of the series into juxtaposition to the oil after the latter has been heated by said vapors and before it passes through said chambers, to preheat the oil.

10. A still comprising an oil supply source, a plurality of evaporating chambers connected in series, each chamber having a spreading table and troughs on either side of the table arranged whereby the oil in passing from one trough to the other will be spread in a layer over said table, a plurality of basins outside the chambers, said basins being in communication with said source of supply and with each other, means for heating the oil in the evaporating chambers, a condensing coil for each chamber arranged each in a different basin and so disposed that they will act successively on the oil passing through said basins, in the same order in which their respective chambers are arranged in their series, means for delivering the oil from said chambers, and means for conducting vapors from said basins.

Signed at the city, county, and State of New York, this 3rd day of July, 1915.

CECIL L. TURNER.

Correction in Letters Patent Reissue No. 14,050.

It is hereby certified that in Letters Patent Reissue No. 14,050, granted January 18, 1916, upon the application of Cecil L. Turner, of New York, N. Y., for an improvement in "Stills," an error appears in the printed specification as follows: Page 4, line 69, claim 5, for the word "is" read *in;* and that the said Letters Patent should be read with this correction therein that the same may conform to the record of the case in the Patent Office.

Signed and sealed this 29th day of February, A. D., 1916.

[SEAL.]

R. F. WHITEHEAD,

*Acting Commissioner of Patents.*

Cl. 196—25.